United States Patent [19]

Goto

[11] Patent Number: 5,426,624
[45] Date of Patent: Jun. 20, 1995

[54] OPTICAL DISK APPARATUS FOR LINKING FRAGMENTED REGIONS IN A USER TABLE OF CONTENTS

[75] Inventor: Soju Goto, Hino, Japan

[73] Assignee: Kabushiki Kaisha Kenwood, Tokyo, Japan

[21] Appl. No.: 111,414

[22] Filed: Aug. 25, 1993

[30] Foreign Application Priority Data

Aug. 28, 1992 [JP] Japan .................. 4-253843

[51] Int. Cl.6 ............................. G11B 7/085
[52] U.S. Cl. ....................... 369/32; 369/50; 369/54
[58] Field of Search ............... 369/13, 32, 47–48, 369/50, 53, 54, 58, 83–84, 111

[56] References Cited

U.S. PATENT DOCUMENTS

| | | | |
|---|---|---|---|
| 4,839,879 | 6/1989 | Sawada et al. | 369/54 |
| 4,949,326 | 8/1990 | Takagi et al. | 369/54 |
| 5,111,442 | 5/1992 | Nakajima et al. | 369/47 |
| 5,124,963 | 6/1992 | Ando | 369/54 X |
| 5,124,966 | 6/1992 | Roth et al. | 369/47 |
| 5,195,066 | 3/1993 | Amemiya et al. | 369/54 X |
| 5,274,617 | 12/1993 | Terashima et al. | 369/58 X |

Primary Examiner—W. R. Young
Attorney, Agent, or Firm—Sixbey, Friedman, Leedom & Ferguson; Gerald J. Ferguson, Jr.; Evan R. Smith

[57] ABSTRACT

An optical disc recording/reproduction apparatus capable of simplifying the overwrite operation of an already recorded disc by designating a music program number. In recording a music program, the music program number is first entered from a ten-key. If the program number is "15", a key "1" and then a key "5" are sequentially depressed. If a record key is depressed within a predetermined time delay from the numerical key input, the start address of the record region of the disc for TNO15 is searched and a record pause state is set. When the record key is again depressed thereafter, the record pause state is released and the music program is overwritten in the record regions of the TNO15 and following regions.

7 Claims, 7 Drawing Sheets

F I G. I

OPTICAL DISK APPARATUS FOR LINKING FRAGMENTED REGIONS IN A USER TABLE OF CONTENTS

BACKGROUND OF THE INVENTION

1. Field of the Invention

The present invention relates to an optical disc recording/reproduction apparatus, and more particularly to a method of recording and reproducing a music program by designating its program number and a method of dealing with fragmented record areas.

2. Related Background Art

A recordable mini disc (MD) has a spiral pre-groove engraved in the record area of the disc. Address information of the disc is FM modulated on the pre-groove. Each music program recorded in the record area is assigned a music program number in the ascending order starting from the inner circumferential area of the disc. The music program number, and start and end addresses of each music program are recorded in a user table of contents (U-TOC) formed at the area inward of the record area in the radial direction of the disc. A new music program is sometimes recorded in MD after several music programs have been already recorded. If the new program is to be overwritten in the area where a particular old music program such as the N-th program has been recorded, a user designates the music program number N. In such a case, there may occur a problem that the new music program cannot be recorded entirely within the record area of the N-th music program.

SUMMARY OF THE INVENTION

It is an object of the present invention to solve the above problem and provide an optical disc recording reproduction apparatus capable of automatically overwriting a new music program in as many record areas as necessary of an already recorded MD.

DETAILED DESCRIPTION OF THE PREFERRED EMBODIMENTS OUTLINE

An embodiment of the optical disc recording/reproduction apparatus according to the present invention will be described with reference to the accompanying drawings.

Figure 1:
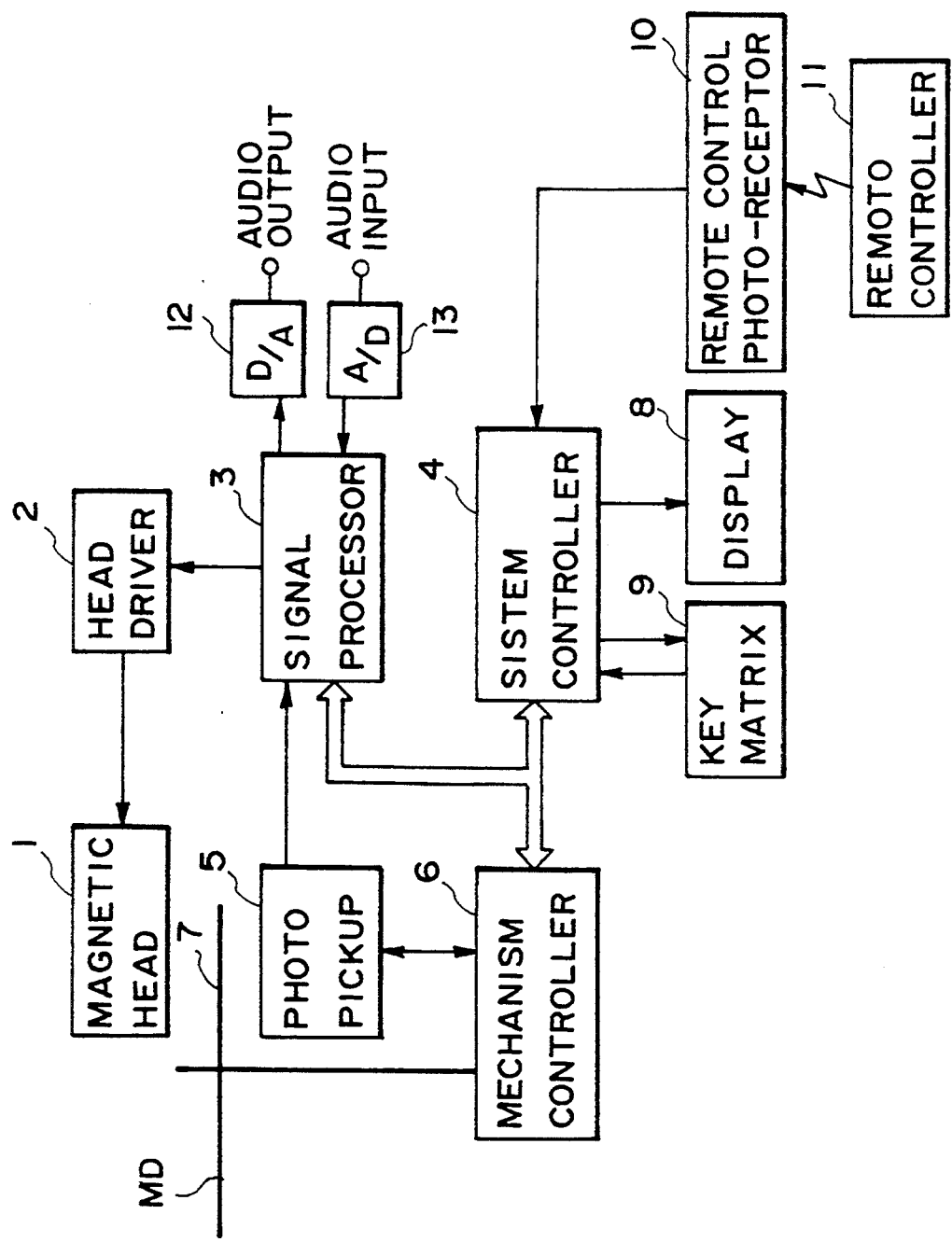
FIG. 1 is a block diagram showing an embodiment of the optical disc recording/reproduction apparatus according to the present invention.

FIG. 1 is a block diagram shown the embodiment of the optical disc recording/reproduction apparatus according to the invention. In FIG. 1, a photomagnetic disc 7 is rotated by a disc motor (not shown). The photomagnetic disc 7 is a mini disc (MD) for the recording/reproduction of information. In the record area of MD, a spiral pre-groove having a swell is engraved. Address information of MD is FM modulated on the pre-groove. A magnetic head 1 is supplied with current from a head driver 2 to apply a magnetic field to the record area of MD 7 in the vertical direction and to record data. The head driver 2 supplies current to the magnetic head 1 in accordance with record information supplied from a signal processor 3. For the recording operation, the signal processor 3 compresses a digital audio signal inputted from an A/D converter 13, interleaves the signal, adds an error correcting code and sub-data supplied from a system controller 4 to the signal, and EFM modulates the signal to generate record information which is outputted to the head driver 2.

In the recording operation described above, recorded audio data of each music program is assigned a serial number as the music program number (TNO). The start and end addresses of each music program on MD 7 are recorded in a predetermined user table of content (U-TOC) in the record area of MD 7 in a predetermined format before the recorded MD 7 is dismounted from the system. The start address of U-TOC, the start address of a music program recordable area, and the start address of a lead-out area of MD 7, are recorded in a disc table of content (TOC).

For the reproduction, a digital audio signal and sub-data are demodulated from a signal reproduced by a photo pickup 5, and outputted to a D/A converter 12 and the system controller 4. The photo pickup 5 is controlled by a mechanism controller 6, and applies a laser beam to MD 7. The reflected beam is used for obtaining a reproduction signal of the recorded information. The photo pickup 5 outputs the reproduction signal to the signal processor 3, and outputs a tracking error signal, a focus error signal, and a wobble signal respectively to the mechanism controller 6. The wobble signal originates from the swell of the pre-groove engraved in MD 7. The mechanism controller 6 controls the disc motor by maintaining the average frequency of the wobble signal to have a predetermined frequency, and supplies current to the tracking coil and focussing coil of the photo pickup 5. The mechanism controller 6 moves the photo pickup 5 to search a designated address in response to an instruction from the system controller 4. The system controller 4 communicates with the signal processor 3 and mechanism controller 6 to control them. The system controller 3 receives address information of MD 7 and an operation instruction from a key matrix 9 or remote control photo-receptor 10, generates data to be recorded in U-TOC or data to be displayed on a display 8, and sends necessary record data to the signal processor 3.

The display 8 is driven by the system controller 4, and displays a time, TNO, level meter information, serial-copy-management-system (SCMS) information, alarm information, or the like.

The key matrix 9 is a device operated by a user by depressing each key. The remote control photo-receptor 10 receives data modulated by an infrared beam, and converts it into a logical level signal which is outputted to the system controller 4 to control the operation of the apparatus.

Figure 2:
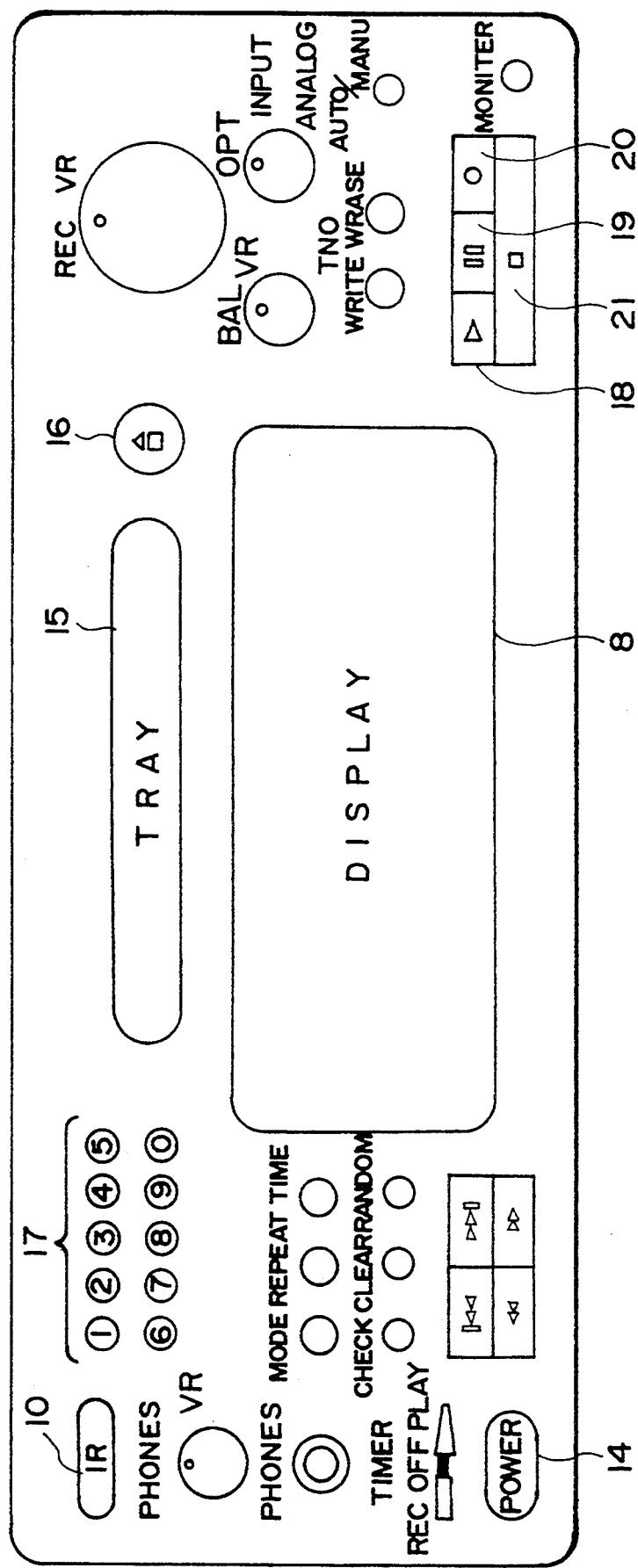
FIG. 2 is a diagram showing the front panel of the optical disc recording/reproduction apparatus of the embodiment shown in FIG. 1.

FIG. 2 shows the front panel of the optical disc recording/reproduction apparatus. In FIG. 2, reference numeral 10 represents a light receiving window for the remote control photo-receptor shown in FIG. 1. Reference numeral 14 represents a power switch, reference numeral 15 represents a disk tray on which MD 7 is placed to load it on the apparatus or unload it therefrom, and reference numeral 16 represents a button used for loading or unloading MD 7.

Reference numeral 17 represents a ten-key of the key matrix 9 shown in FIG. 1, reference numeral 18 represents a play key, reference numeral 10 represents a pause key, reference numeral 20 represents a record key, and reference numeral 21 represents a stop key.

In recording a music program on MD 7 of the optical disc recording/reproduction apparatus by designating a music program number, first, the music program number is entered from the remote controller 11 or ten-key 17. For example, if the music program number is "15", a key "1" of the ten-key 17 and then a key "5" are sequentially depressed. In the case of the remote controller 11, data "1" and then data "5" are sent from the remote control photo-receptor 10 to the system controller. If a record key is thereafter depressed within a predetermined time delay from the input of the music program number, the start address of the record region of MD 7 for TNO15 is searched and a record pause state is set. When the record key 20 or a record key of the remote controller 11 is depressed, the record pause state is released and the music program is overwritten in the record regions of the TNO15 and following regions. In the case where the designated music program number is larger than the largest music program number of programs already recorded in MD 7, if the record key 20 or the record key of the remote controller 11 is depressed within a predetermined time delay from the input of the music program number, a record pause state is set at the address next to the end address of the music program having the largest music program number. If the record key 20 or the record key of the remote controller 11 is thereafter depressed again, the record pause state is released and the music program is recorded.

U-TOC OPERATION

Figure 3:
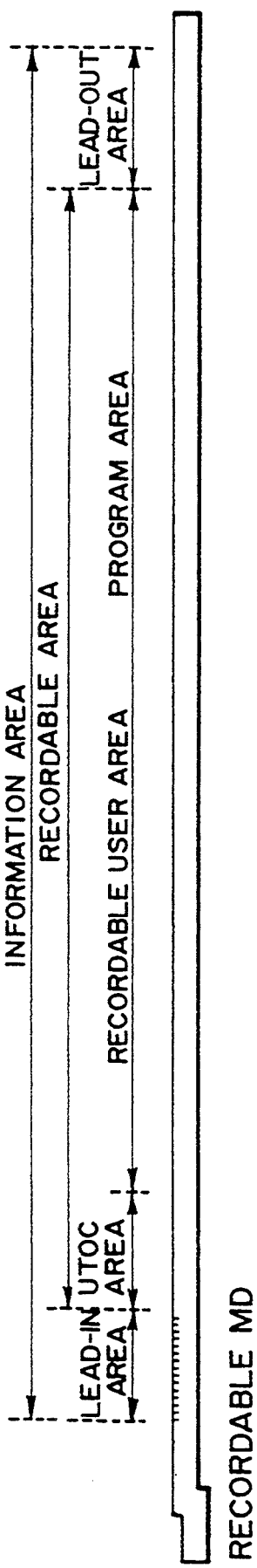
FIG. 3 shows the format of the information area of a recordable MD.

A recordable MD disc has a spiral groove engraved in the record area of the disc. The engraved spiral groove has a swell so that a swell frequency of 22.5 kHz can be detected when the disc rotates at a standard rotation speed. Therefore, the rotation of MD is controlled by maintaining the detected frequency to be 22.05 kHz. The swell is FM modulated by address information at the deviation frequency of 1 kHz. This address information is used to detect a particular position of the spiral groove. In the recordable MD address system, a logical access is executed in units of a cluster containing 36 sectors. Namely, the address of a sector is represented by a 16-bit cluster address and an 8-bit sector address. For example, an address (11FFH: 1FH) indicates the cluster address of 11FFH and the offset sector address 1FH of the cluster at 11FFH. The disc area of a recordable MD includes, as shown in FIG. 3, a lead-in area, a U-TOC area, and a recordable user area. A music program is recorded in the recordable user area. TNO-1 to TN0-255 are identifiers to be assigned to a plurality of music programs. For example, if a music program TNO-5 is recorded in the region from a start address 1F0BH: 0AH to an end address 2A2AH: 3BH, the identifier TNO-5 and its associated start address are stored in the U-TOC area. The U-TOC is therefore an information management table for music programs stored in the recordable user area.

Figure 4A:
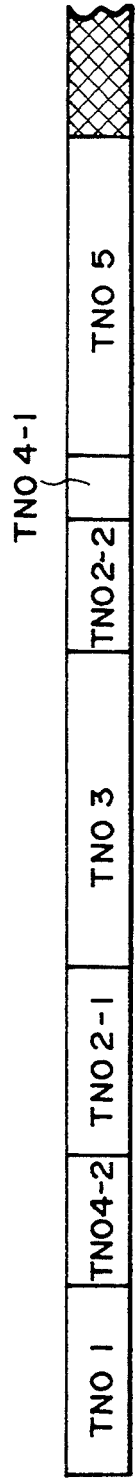
FIG. 4A to FIG. 4C are diagrams showing examples of a record state of music programs on MD.
Figure 5A:
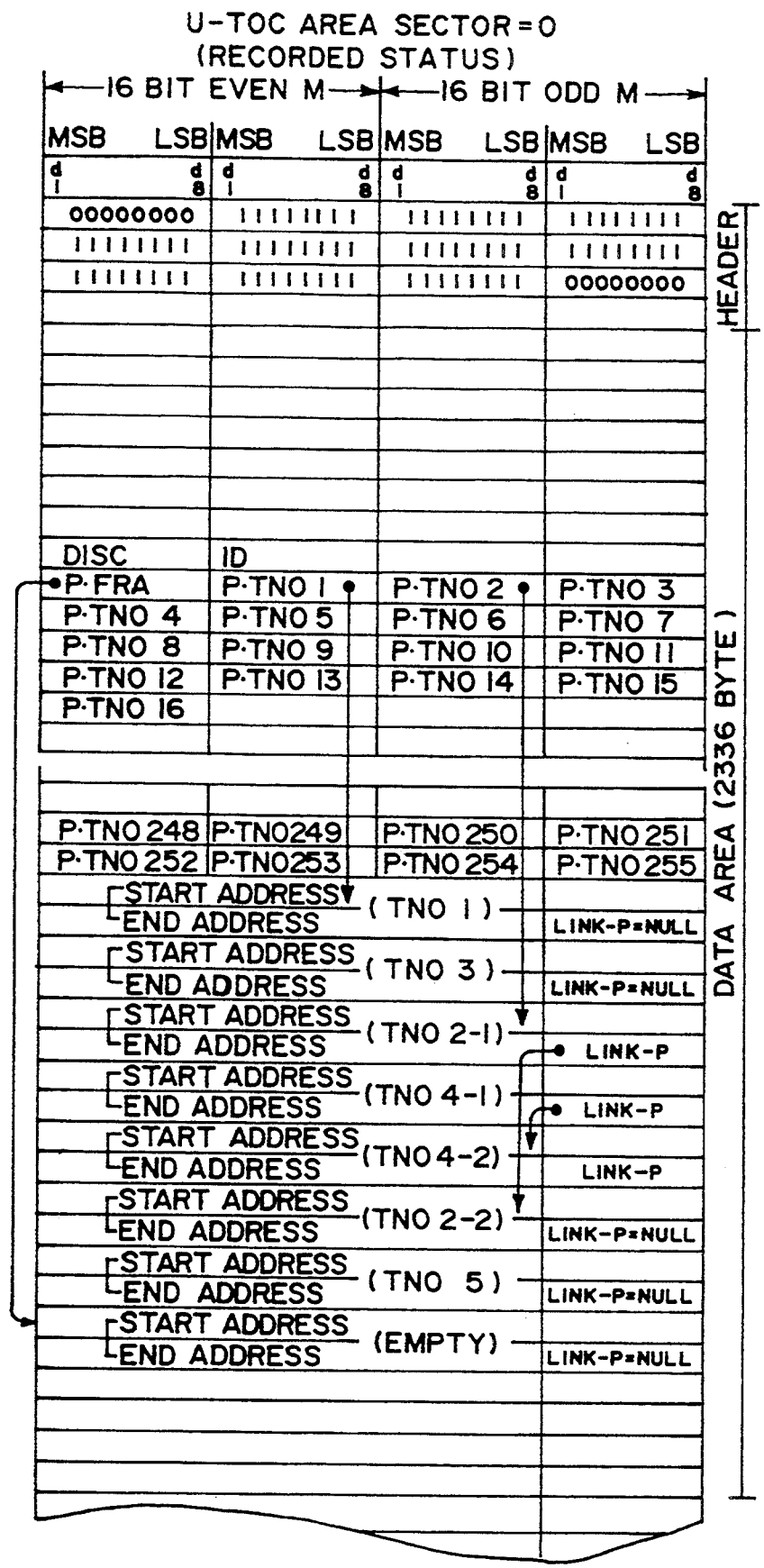
FIG. 5A to FIG. 5D are diagrams showing the contents of a U-TOC table of MD corresponding to the record states shown in FIG. 4A to FIG. 4C.

As shown in FIG. 4A, in the following description of an embodiment, it is assumed that music programs TNO-1 to TNO-5 have been recorded in the user area. Music programs are not necessarily recorded in the order of serial numbers of the TNO identifiers. Some musical program such as TNO-2 is stored in fragmented user areas as TNO-1 and TNO-2. FIG. 5A shows an example of U-TOC corresponding to the music programs TNO1 to TNO5 recorded in the user area as shown in FIG. 4A.

In FIG. 5a, only the content of U-TOC necessary for the description of this embodiment is shown. Stored in a field B of U-TOC are pairs of start and end addresses of the record regions for the music programs TNO1 to TNO5. A fragmented program such as TNO2 is recorded as TNO2-1 and TNO-2, which are linked together by a link pointer Link-P of TNO-1 indicating the start address of The music program TNO4 is linked in the same manner. A music program unnecessary for such linkage has a null pointer Link-P=NULL.

Figure 4B:
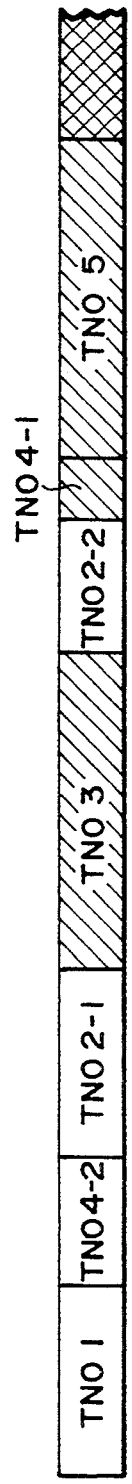
Figure 4C:
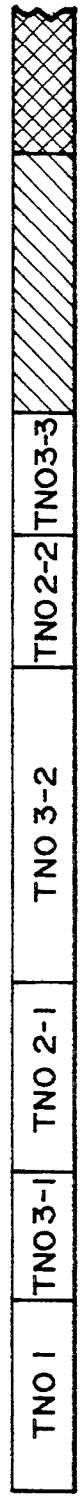

Stored in a field A of U-TOC is a pointer to address information of the field B. In FIG. 5A, P-TNO1 is an address of a memory storing the address information of TNO1, and is a pointer to TNO1. A pointer P-FRA is a pointer to the start address of an unrecorded area (cross hatched area as shown in FIGS. 4A to 4C) or an overwrite area (hatched area) of MD. When a music program is to be recorded in MD, the recording starts from the user area at the start address pointed by P-FRA.

Figure 5B:
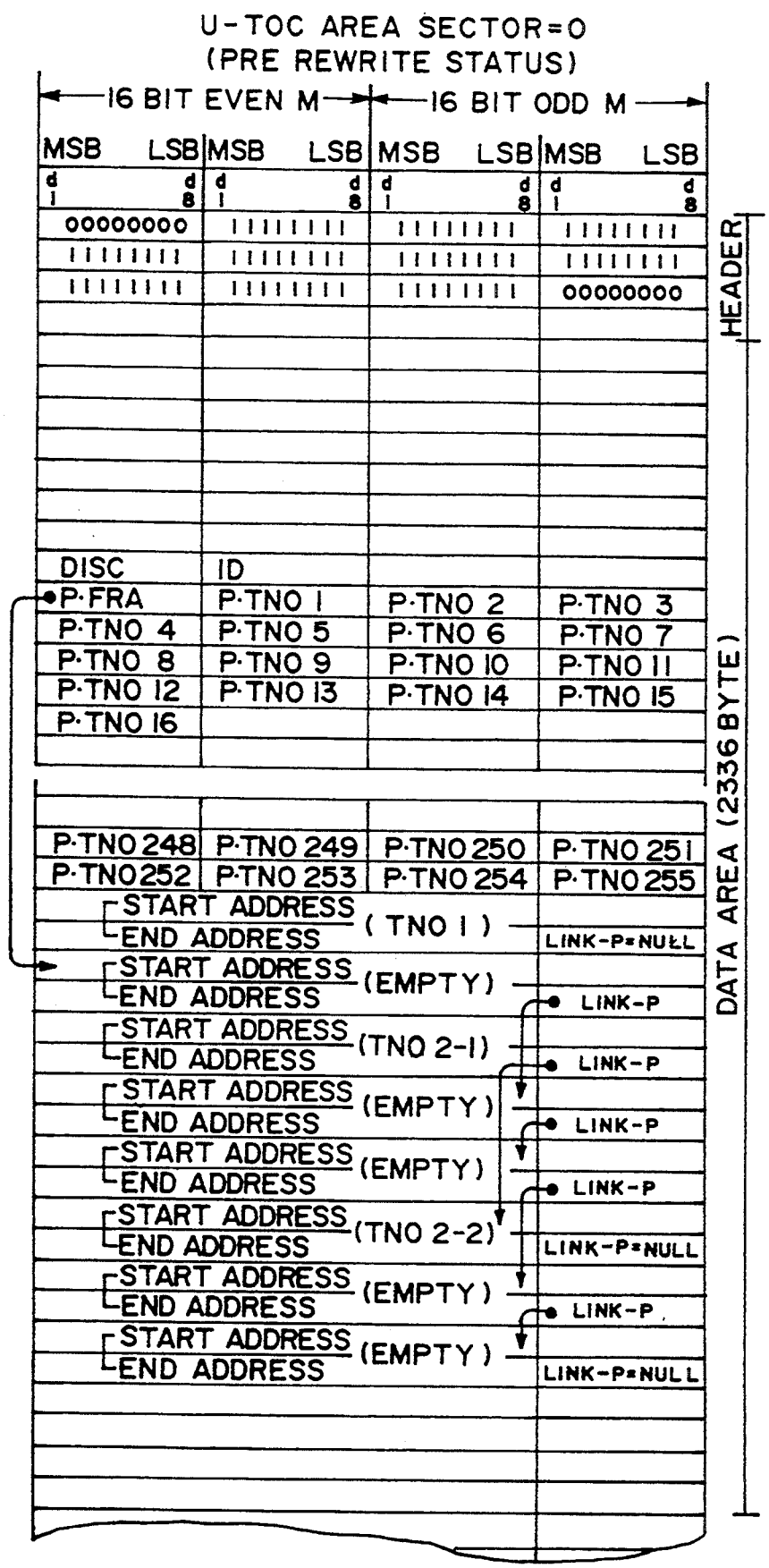

If a user intends to record a new music program by overwriting it in the regions where the music programs TNO3 to TNO5 have been recorded as shown in FIG. 4A. In this case, the program number 3 of TNO3 is entered and the record key is depressed. The new music program is overwritten in the hatched areas shown in FIG. 4B. The old music programs are not erased, but only the U-TOC area is edited as shown in FIG. 5B. Namely, the pointer P-FRA indicates the start address of the first empty region (hatched area), and a plurality of empty regions shown in FIG. 4B are linked together by pointers Link-P.

Figure 5C:
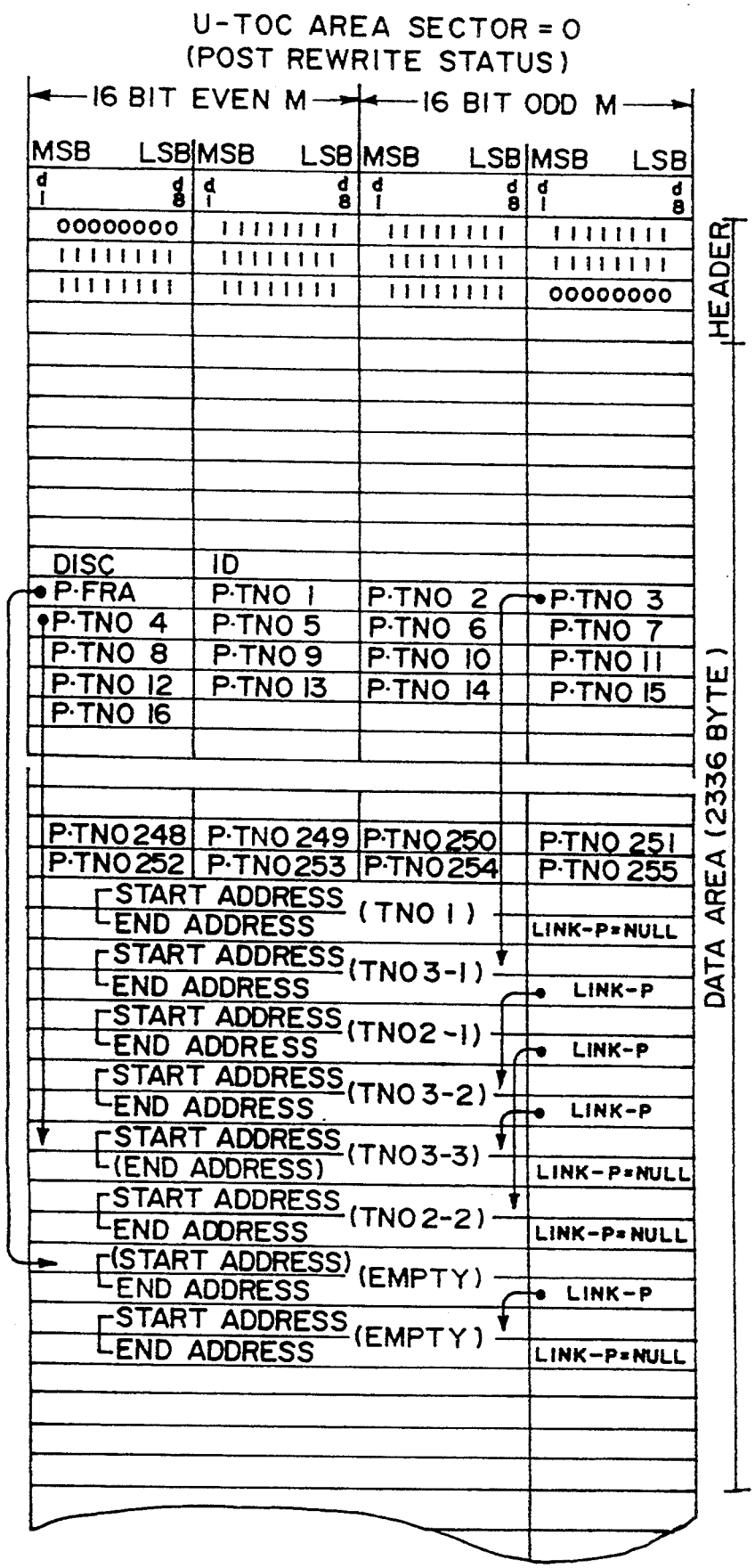

The new music program is recorded starting from the region at the start address indicated by the pointer P-FRA (i.e., at the start address of the region of TNO4-2). This program is overwritten in the regions of the old music programs TNO4-2, TNO3, and TNO4-1, and in a partial region of TNO5. As a result, the new music program TNO3 is recorded as shown in FIG. 4C as TNO3-1, TNO3-2, and TNO3-3, and the content of U-TOC is edited as shown in FIG. 5C. Namely, the pointer P-TNO3 indicates the start address of the region of TNO3-1, the pointer Link-P of TNO3-1 indicates the start address of the region of TNO3-2, the pointer Link-P of TNO3-2 indicates the start address of the region of TNO3-3, and the pointer Link-P of TNO3-3 is set with a NULL pointer indicating the end of the program TNO3. When the program TNO3 is designated for the reproduction, this program is read sequentially from the three regions linked together. The pointer P-FRA indicates the empty region at the start address next to the end address of the region of TNO3-3. A new music program to be recorded without overwriting is recorded from the start address indicated by the pointer P-FRA. The end address of the region for TNO3 and the start address of the first empty area are changed to new addresses from the old addresses shown in FIG. 5B. The new addresses are indicated by parentheses in FIG. 5C.

The content of U-TOC in MD is copied to a main memory of the system processor when MD is reproduced or recorded. For the reproduction, the processor selects and reproduces a user designated music program on MD by referring to the copied content of U-TOC in the main memory. For the recording, the copied content of U-TOC is edited in the manner described above. The edited content of U-TOC in the main memory is thereafter overwritten in the U-TOC area of MD.

Figure 5D:
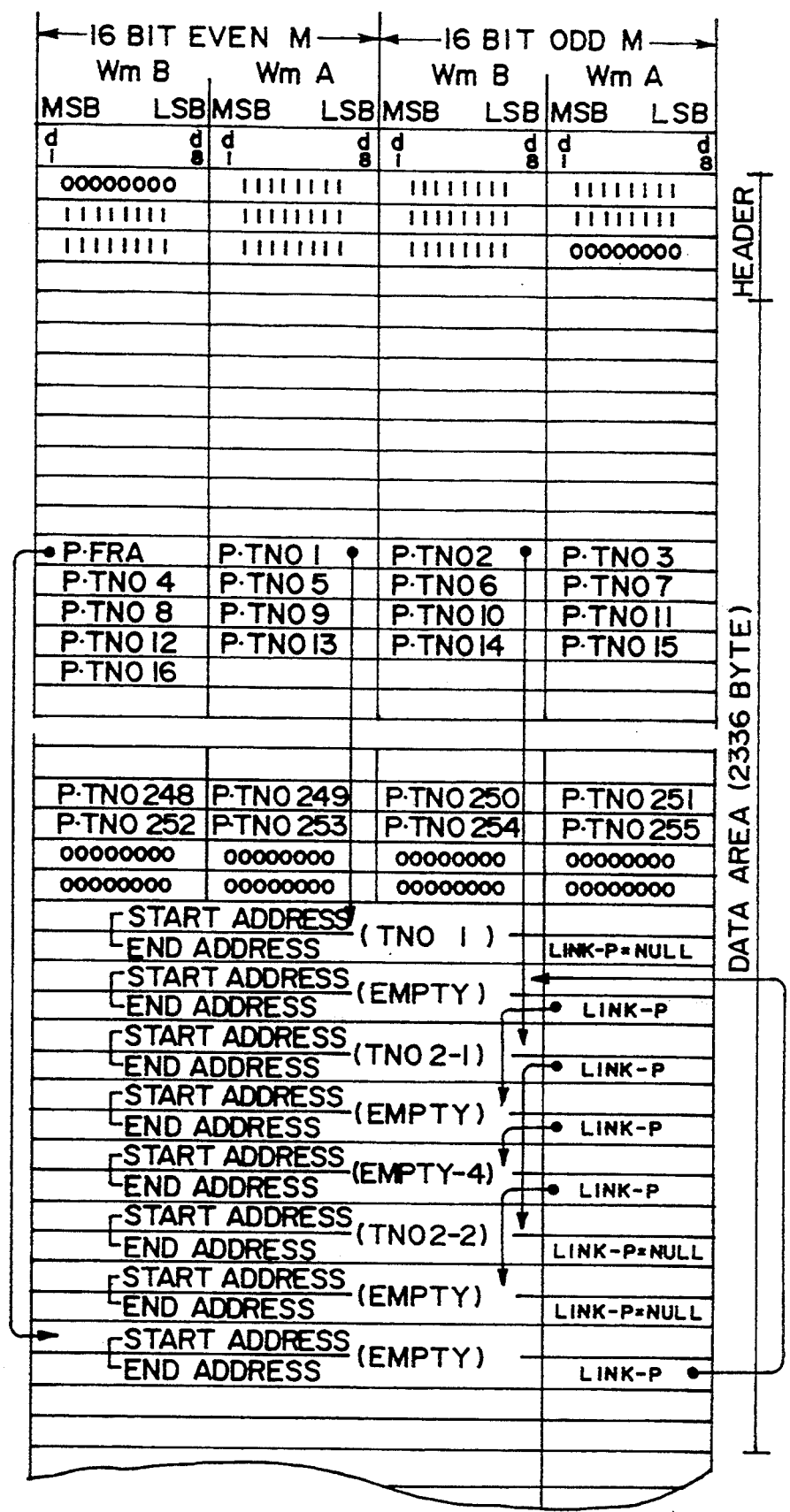

FIG. 5D shows another example of the edited content of U-TOC different from the example shown in FIG. 5B, when overwrite empty regions (hatched areas shown in FIG. 4B) are generated. In this example, although the pointer P-FRA maintains to indicate the start address of the unrecorded region (cross hatched area shown in FIG. 4A), the pointer Link-P of the unrecorded region indicates the start address of a music program TNO3. The other overwrite regions are linked together by pointers Link-P. In recording a new music program, the music program is first recorded in the unrecorded region, and if the unrecorded region has been used completely, the new music program is recorded in the overwrite empty regions (hatched areas).

It is not necessary to estimate the amount of empty regions of old music programs in which a new music program is overwritten. A new music program can be automatically recorded in as many empty regions as necessary.

What is claimed is:

1. An optical disc recording and reproduction apparatus which loads an optical disc having a user table of contents and recordable user area for the recording and reproduction of music programs assigned serial music program numbers, the user table of contents including address information for fragmented regions in the recordable user area, where said apparatus comprises:

designating means for receiving a user designation of a music program number and a record start instruction given by the user;

memory means for storing a copy of the user table of contents of the loaded optical disc;

linking means connected to the memory means and the designating means and responsive to the music program number designated by the user and the record start instruction given by the user for editing the copied user table of contents to link fragmentary regions corresponding to the designated music program number and at least one following music program number together to form a single recordable region combining said fragmentary regions, and recording initiation means connected to said memory means for identifying a start position of the linked recordable region and setting at least one of a record start state and record pause state at said start position.

2. The apparatus of claim 1 wherein the recording initiation means further comprises means for determining whether said designated music program number is larger than a largest used music program number, and if so, setting one of said record start state and said record pause state at a position after the end position of the music program having said largest music program number.

3. The apparatus of claim 1 wherein the designating means receives a user music program number designation identifying a recordable user area which has previously been recorded with a music program.

4. The apparatus of claim 3 wherein, when the music program number is designated by the user, a music program number greater than the number designated by the user identifies a recordable user area located immediately adjacent to the area identified by the user designated music program number for overwriting, and said adjacent recordable user area already contains a recorded music program at the time of designation.

5. The apparatus of claim 4 wherein the user record start instruction is an instruction to overwrite the designated recordable user area with a new music program which will not fit in the recordable user area specified by the designated music program number.

6. The apparatus of claim 5 wherein the recording initiation means further comprises means for controlling recording to record the new music program in a plurality of said fragmentary regions which are non-contiguous and which are linked in said user table of contents by said linking means.

7. The apparatus of claim 1 wherein the recording initiation means further comprises means for controlling recording to record a single new music program in a plurality of said fragmentary regions which are non-contiguous and which are linked in said user table of contents by said linking means without overwriting previously recorded music programs in recordable user areas other than the one specifically identified by the user designation of the music program number.

* * * * *